Patented June 28, 1949

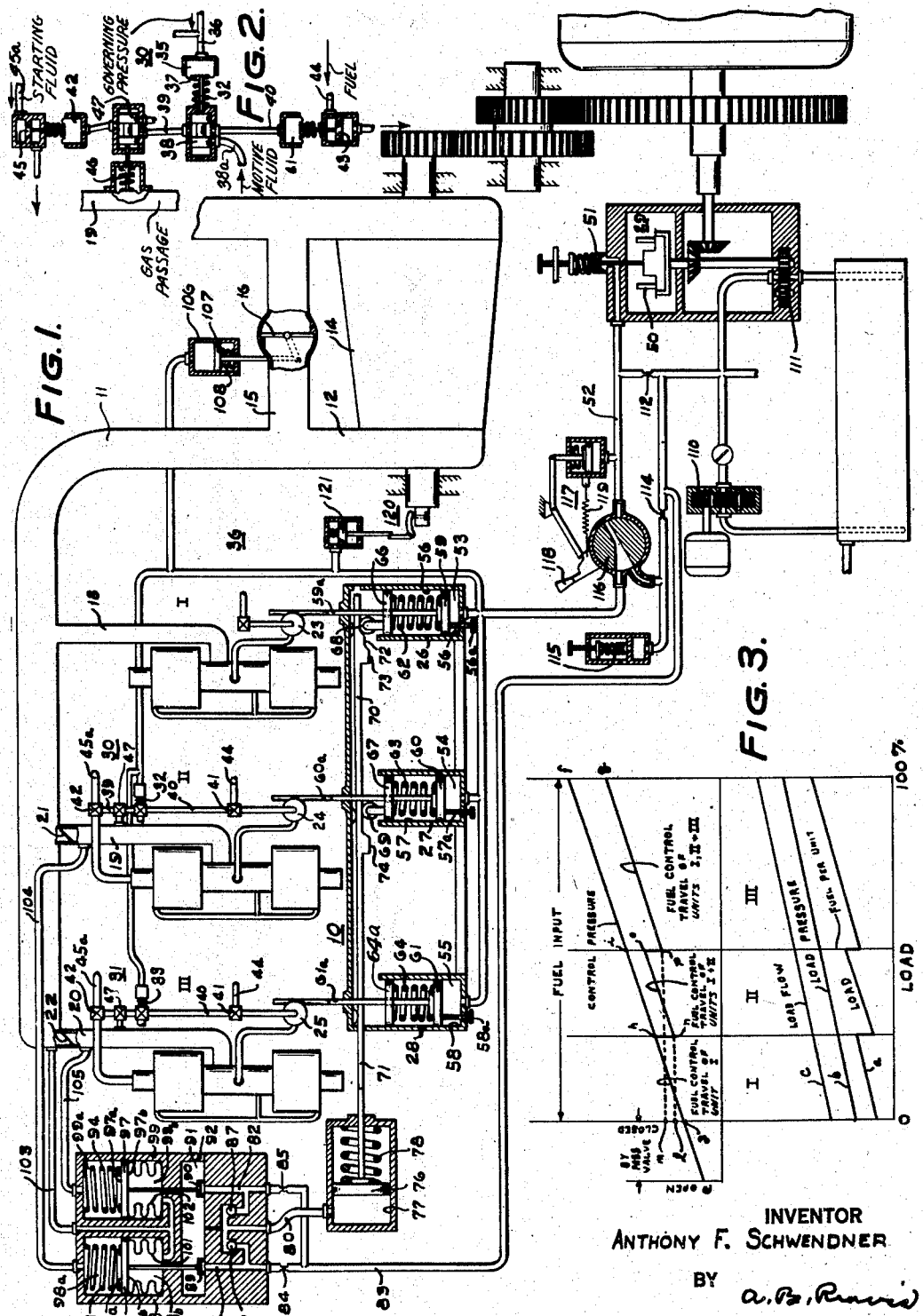

2,474,697

UNITED STATES PATENT OFFICE 2,474,697

POWER PLANT CONTROL MECHANISM

Anthony F. Schwendner, Ridley Park, Pa., assignor to Westinghouse Electric Corporation, East Pittsburgh, Pa., a corporation of Pennsylvania Application December 12, 1945, Serial No. 634,519

7 Claims. (Cl. 60—13)

The invention relates to a power plant wherein a plurality of free-piston engine and compressor units utilize fuel and air to provide motive fluid, consisting of products of combustion and air, used to drive a turbine, and it has for an object to divide the plant into a plurality of units, including a normally active group and one or more additional units, together with a governor driven by the turbine and operating to start and stop the additional units and to vary the fuel input to the active unit or units in response to the load to secure operation over the load range from no load to full load.

A further object of the invention is to provide apparatus of the above character wherein input to the turbine is also controlled by a by-pass for the latter having a valve operated by the governor.

A further object of the invention is to provide, for a normally active free-piston engine and compressor unit operating either alone or with one or more additional units to furnish motive fluid to drive a turbine, controlling apparatus including a governor driven by the turbine and operative to start and stop the additional unit or units and to control the input of fuel to the active unit or units and including means responsive to starting or stopping of an additional unit to reset the fuel control spring or springs for all of the then-active unit or units so as to avoid, at the instant of starting of an additional unit, change in gas output and to equalize the fuel inputs to the active units, if more than one unit is active.

These and other objects are effected by the invention as will be apparent from the following description and claims taken in connection with the accompanying drawing, forming a part of this application, in which:

Fig. 1 is a diagrammatic view of power plant apparatus involving the present invention;

Fig. 2 is a diagrammatic detail view of starting apparatus; and

Fig. 3 is a graph showing operating characteristic curves in relation to load.

In the drawing, the motive fluid generator, at 10, utilizes fuel and air to provide motive fluid, consisting of products of combustion and air, supplied to a conduit or manifold 11 having a branch 12 connected to the inlet of the turbine 14 and a by-pass branch 15 connected to the turbine exhaust. The by-pass branch has a by-pass valve 16 operating, as hereinafter described, to vary the energy input to the turbine.

The motive fluid generator, at 10, includes free-piston engine and compressor units arranged as a normally active unit and one or more additional units rendered active as the load increases and rendered inactive as the load decreases. As shown, there is provided a normally active unit I and two additional units II and III.

The normally active unit I and the additional units II and III are connected, respectively, by passages 18, 19 and 20 to the manifold 11 and the passages 19 and 20 for the units II and III are provided with check valves 21 and 22 opening toward the manifold.

In going from no load to full load, the additional unit II becomes active at a load which is a predetermined fraction of full load and the additional unit III becomes active at a higher fractional load. With decreasing load, the units III and II become inactive at the higher and the lower fractional load points.

The units I, II and III are provided with variable fuel-feeding devices 23, 24 and 25 connected to pressure-responsive operating devices 26, 27 and 28, respectively, controlled by the governor, at 29, driven by the turbine. The additional units II and III are provided with starting and stopping apparatuses, diagrammatically indicated at 30 and 31, controlled by the governor so that, with increase in load, as the lower and higher fractional load points are reached, the units II and III are started, and, with decrease in load, unit III is first stopped, followed by stopping of unit II.

While the starting and stopping apparatuses, at 30 and 31, may be of any suitable character for starting and stopping the units, as shown, the apparatuses are of the type disclosed and claimed in the application Serial No. 636,933, filed December 22, 1945, and are similar except that the load spring 32 of the apparatus, at 30, is weaker than the load spring 33 of the apparatus, at 31. Therefore, the description of one apparatus will suffice for both. Referring to Fig. 2, each apparatus includes a pressure-responsive device 35 connected to the controlling pressure conduit system, at 36, controlling liquid pressure of the latter being effective to move a member 37 against the force of the load spring 32 of the apparatus, at 30, and against the force of the load spring 33 of the apparatus, at 31. Movement of the member in response to increase in controlling liquid pressure operates the relay 38 to admit motive liquid from the passage 38a to the branch conduits 39 and 40 for operating pressure-responsive devices 41 and 42 to open, respectively, the valve 43 in the fuel supply line 44 and the valve 45 in the line 45a for supplying air or gas from a suitable pressure source to initiate movement of the unit. Upon starting of a unit, the generated gas pressure thereof acts on the device 46 to operate a valve 47 to cut off the supply of motive liquid to the pressure-responsive device 42, whereupon the valve 45 closes to interrupt the supply of starting air or gas to the unit.

Assuming that an additional unit has been placed in operation because of increase in load, as the load decreases to decrease the controlling liquid pressure below the point required to position the relay 38 to supply motive liquid to the pressure-responsive device 41 to open the fuel valve 43, such relay is moved in response to the load spring to interrupt the supply of fuel to the unit, whereupon the latter comes to a stop.

The governor, at 29, is of the transformer type, that is, a change in centrifugal force due to speed is transformed into a controling liquid pressure change, the governor employed providing for increase in controlling pressure in response to decrease in speed due to increase in load. To this end, the governor includes flyweights 50 connected to a cup valve 51 controlling the escape of liquid from the controlling pressure space provided by the conduit system, at 36, normally communicating with the conduit 52, the expansible chambers 53, 54 and 55 of the pressure-responsive devices 26, 27 and 28 communicating with the conduit system, at 36, and the pressure-responsive spaces of the starting and stopping devices, at 30 and 31, connected to the conduit system, at 36.

The pressure-responsive devices 26, 27 and 28 include cylinders 56, 57 and 58 cooperating with pistons 59, 60 and 61 to form the expansible chambers 53, 54 and 55 and the pistons are connected by the rods or fuel control elements 59a, 60a and 61a to the fuel-feeding devices 23, 24 and 25, the arrangement being such that liquid under controlling pressure in the controlling pressure space, provided in part by the conduit system, at 36, exerts force on the pistons 59, 60 and 61 to move the fuel control elements to increase the fuel fed by the devices 23, 24 and 25 to the engine and compressor units I, II and III. Springs 62, 63 and 64 exert forces on the pistons to reduce the fuel feed. Thus, increase in controlling liquid pressure, provided by the governor in response to decrease in speed pursuant to increase in load, results in movement of the pistons 59, 60 and 61 to increase the fuel input until the increase in force due to pressure is balanced by increase in spring force occasioned by the movement.

The springs are arranged to exert differing forces on the pistons, the spring 62 for unit I exerting the least force, the spring 63 for unit II exerting a larger force, and the spring 64 for unit III applying a still larger force, with the result that unit I is effective over a lower load zone, units I and II are effective over an intermediate load zone, and all of the units are effective over the uppermost load zone. To provide for this mode of operation, the cylinders 56, 57 and 58 have adjustable stops 56a, 57a and 58a cooperating with the pistons 59, 60 and 61 to stop the latter with the fuel control elements 59a, 60a and 61a at the minimum fuel input positions. By adjusting the stops, both the spring loads and the fuel input positions are varied. As shown, the stops are adjusted for the spring 62 having the least load, the spring 63 having a higher load, and the spring 64 having the highest load. As each spring must be overcome by the control pressure to increase the fuel input, it will be apparent that the pistons must be acted upon by progressively-increasing control pressures to increase the inputs of the fuel controls of units I, II and III, the loading of the springs varying the input positions of the fuel controls such that the control of unit I has the least fuel input, that of unit II a larger fuel input, and that of unit III the largest fuel input. As hereinafter pointed out, when unit II is started in response to the control pressure reaching a point corresponding to that required to exert force on the piston 60 to balance the load of the spring 63 at its initial setting, the spring 62 is reset so that its loading and the input position of the fuel control of unit I correspond to the setting of spring 63 and the initial input position of the fuel control of unit II, the arrangement being such that, at the end of the lower load zone and at the beginning of the intermediate load zone, the total gas output and the total fuel input remain unchanged and the input of fuel to the units is equalized. The fuel controls of the two units travel together over the intermediate load zone in response to the control pressure which increases as the load increases; and, when the upper limit of the intermediate load zone is reached, the control pressure starts unit III, bringing about resetting of the springs 62 and 63 and adjustment of the input positions of units I and II to correspond to the setting of spring 64 and the initial input position of the fuel control of unit III, the arrangement being such that, as before, the total gas output and fuel input remain unchanged and the inputs of fuel to the active units are equalized.

With all of the units in operation, as the load is decreased, the additional units are successively stopped at the predetermined load points and the fuel control spring or springs of the remaining active unit or units are reset to avoid momentary change in gas output and to equalize the fuel inputs to the active units, if more than one unit remains active.

Referring now to the resetting mechanism for the springs 62 and 63 and the fuel controls of units I and II, the upper ends of such springs engage members 66 and 67 movable upwardly and downwardly to vary the forces applied by the springs 62 and 63 to the pistons 59 and 60. To position the members 66 and 67, the latter are provided with follower rollers 68 and 69 which engage the track 70 on the cam bar 71.

Since resetting of the spring 64 is not required, its upper end engages a member or abutment 64a fixedly secured in any suitable manner to the stationary component of the pressure-responsive device 28.

The track has a cam portion 72 engageable with the roller 68 for increasing the compression of the spring 62 upon starting of unit II and cam portions 73 and 74 for increasing the compression of the springs 62 and 63 upon starting of unit III, the cam portion 73 being higher than the cam portion 72 to effect still further compression of the spring 62.

The cam portions are positioned along the bar or operating member 71 to effect sequential movement of the members 66 and 67, movement of the bar or operating member 71 to the right first positioning the cam portion 72 to engage the roller 68 to move the member 66 to compress the spring 62 and further movement in the same direction positions the cam portion 73 to effect further compression of the spring 62 and positions the cam portion 74 to engage the roller 69 to compress the spring 63. With the bar or operating member at the right and cam portions 73 and 74 engaging the rollers 68 and 69, movement to the left first displaces cam portion 73 from engagement with the roller 68 and cam portion 74 from engagement with the roller 69, leaving the cam portion 72 engaging the roller 68, and continued movement to the left displaces the cam portion 72 from engagement with the roller 68, whereupon the members 66 and 67 will be positioned as shown in Fig. 1.

The bar or operating member 71 is moved to reset the spring 62 or the springs 62 and 63 by means of an operating piston 76 connected to the bar or operating member and movable in the operating cylinder 77. A load spring 78 exerts force on the connected operating piston and bar or operating member to move the latter to the left, and means for admitting liquid under controlled pressure to the cylinder to exert force on the connected piston and bar or operating member to move the latter to the right against the increasing force of the load spring, the piston moving until the liquid pressure force is balanced by the spring force. The scale effect of the load spring 78 may, therefore, be depended upon as the means for positioning the bar or operating member 71 for the desired cam operation for resetting of the springs 62 and 63 or the spring 62, if liquid is supplied to the operating cylinder at definite and the required pressure values, and apparatus serving this purpose will now be described.

The operating cylinder 77 has its supply passage 80 connected to pressure spaces 81 and 82 supplied with liquid from the pressure conduit 83 through orifices 84 and 85. Check valves 86 and 87 open from the spaces toward the operating cylinder so that the higher of the space pressures is effective in the cylinder, such higher pressure closing the check valve of the space having the lower pressure.

The pressures in the spaces 81 and 82 are controlled by the cup valves 89 and 90 arranged in the chamber 91 having a drain outlet 92 and the cup valves are urged in closing directions to increase the space pressures by springs 93 and 94, each valve moving in this way until the force of its spring is balanced by the opposing force of space pressure acting on the area of the cup valve exposed to such pressure. Thus, it will be seen that the force of each spring 93 and 94 measures or determines the pressure of liquid in each of the spaces 81 and 82. With suitable springs, there may be provided the required liquid pressures in the spaces for movement of the operating piston 76 to the predetermined positions for resetting of the fuel control spring 62 or the springs 62 and 63.

The spring 94 is arranged to exert a larger force on the cup valve 90 than is exerted by the spring 93 on the cup valve 89, the spring 93 exerting a force to provide a pressure positioning the operating piston 76 to engage the cam portion 72 with the roller 68 to adjust the spring 62 and the spring 94 providing a higher pressure to position the operating piston with the cam portions 73 and 74 engaging the rollers 68 and 69 to adjust both of the springs 62 and 63.

The cup valves 89 and 90 are connected to piston members 96 and 97 having upper pressure areas 96a and 97a and lower pressure areas 96b and 97b. The piston members 96 and 97 are connected to enclosures 98 and 99 by bellows elements 101 and 102 so that each piston member and its bellows divides the interior of the enclosure into upper and lower pressure spaces, the enclosure 98 being divided into upper and lower pressure spaces 98a and 98b and the enclosure 99 into upper and lower pressure spaces 99a and 99b.

The lower pressure spaces 98b and 99b are connected, by means of a conduit 103, to the manifold 11, with the result that manifold pressure is normally effective to exert upward force on the piston members 96 and 97 to overcome the springs 93 and 94 and open the cup valves so as to prevent the development of operating pressures in the spaces 81 and 82.

With only unit I in operation over the lower load zone, the pressure in the manifold 11 urges the branch passage check valves 21 and 22 to closed position and acts on the lower pressure areas 96b and 97b to open the cup valves 89 and 90 against the forces of the springs 93 and 94 to avoid the development of operating pressures in the spaces 81 and 82. With increase in load to the lower of the fractional load points, as determined by the liquid under controlling pressure supplied by the conduit system, at 36, and which pressure is fixed by the governor, the increasing controlling liquid pressure operates the apparatus, at 30, to start unit II and the motive fluid generated by the latter increases in pressure to open the check valve 21, whereupon the pressures in the manifold and in the branch passage 19 will be equalized and units II and I then jointly supply motive fluid to the turbine.

A pipe 104 is connected to the branch passage 19 at the unit side of the check valve 21 so that pressure of motive fluid in the branch passage at that side of the check valve is supplied for action on the upper pressure area 96a of the piston member 95 in opposition to manifold pressure applied to the lower pressure area 96b. As the pressure areas 96a and 96b are equal, building up of pressure applied to the upper area reduces the opening force applied to the cup valve 89 until, with the check valve 21 open and motive fluid flowing through the branch passage 19 from unit II to the manifold, the pressures applied to the upper and lower pressure areas 96a and 96b are balanced or are neutralized, whereupon the cup valve is positioned entirely by the spring 93 and pressure of liquid in the space 81, the pressure having such value that opening force thereof exerted on the cup valve balances the spring force.

Thus, the spring 93 is rendered effective, pursuant to starting of unit II, to establish the pressure required in the space 81 and in the operating cylinder 77 to position the operating piston 76 to load the fuel control spring 62 by compression of the latter incident to the cam portion 72 engaging the roller 68 to equalize the forces exerted by the springs 62 and 63, this operation involving decrease in fuel input to unit I to avoid, at the instant of starting of unit II, increase in total fuel input and total gas output and to equalize the fuel inputs to units I and II, resetting of the spring 62 reducing the fuel control travel of unit I to correspond to the initial fuel control position of unit II so that the fuel controls of the two units travel together in response to the governor for the intermediate load zone.

As the upper limit of the intermediate load zone is approached, unit III is similarly started and the springs 62 and 63 are reset so as to divide the load among the units, the pipe 105 communicating with the branch passage 20 applying pressure to the upper pressure area 99a to balance out the effect of manifold pressure on the lower pressure area 99b to produce in the space 82 liquid pressure determined by the spring 94 in order that the operating piston 76 may be positioned to reset the springs by engaging the cam portion 73 with the roller 68 and the cam portion 74 with the roller 69.

With decrease in load, passage through each fractional load point results in stopping of the corresponding unit, whereupon the check valve in the branch passage of the latter closes and the declining pressure at the unit side of the check valve results in the manifold pressure becoming effective to open the cup valve corresponding to the additional unit being stopped.

In addition to the controlling liquid pressure controlling the input to the turbine by varying the fuel feed, such pressure is also supplied by the conduit system, at 36, to the cylinder 106 having a piston 107 therein operatively connected to the by-pass valve 16, the spring 108 exerting force on the piston to move the valve 16 in an opening direction and pressure applied to the piston exerting force thereon to move the valve in a closing direction.

Oil is supplied to the conduit 52 either by the motor-driven pump 110 or by the turbine-driven pump 111 through the orifice 112 and is supplied to the conduit system, at 36, for manual starting and control, from the motor-driven pump through the orifice 114. To start the plant, the motor-driven pump 110 is placed in operation to assure of an initial lubricating oil supply, the manual control device, at 115, is suitably adjusted, and the starting valve 116 is positioned as shown in Fig. 1, the fuel input and the by-pass valve 16 being subject to pressure in the conduit system, at 36, and which pressure is varied by manual adjustment of the back-pressure valve or control for starting, at 115.

With the turbine stationary and the governor cup valve consequently closed, the motor-driven pump 110 also supplies pressure effective on the apparatus, at 117, to latch the starting valve 116 in starting position to which it is moved by the handle 118. As the turbine increases in speed, its governor reduces the pressure in the conduit 52 and the apparatus, at 117, operates to unlatch the starting valve, whereupon the spring 119 moves the valve to effect communication of the conduit 52 with the conduit system, at 36, to place the fuel input and operation of the by-pass valve under control of the governor.

The turbine drives an emergency or auto stop governor, at 120, which is effective, upon overspeeding of the turbine to a predetermined extent, to trip open the escape valve 121 for the controlling liquid pressure passage or conduit system, at 36, whereupon the fuel input to the units is reduced to a minimum and the by-pass valve 16 is fully opened.

All of the foregoing features concerned with starting, automatic change-over from manual to governor control, control of input to the turbine by varying the fuel input to the generator and adjusting the turbine by-pass valve by means of controlling liquid pressure provided by the governor driven by the turbine, the controlling liquid pressure increasing and decreasing as the load increases and decreases, and an auto stop or emergency governor driven by the turbine and effective suddenly to reduce the controlling liquid pressure to minimize the fuel input and open the by-pass valve are all more particularly disclosed and claimed in my application Serial No. 634,518, filed Dec. 12, 1945. The present application distinguishes over said application in respect to unit operation of the free-piston engine and compressor units and to particular features of control providing automatically for cutting in and out of units as determined by the load and sharing of the load by the active units, where more than one unit is active, with the governor driven by the turbine operating to control the energy input to the latter by controlling the fuel input to the active unit or units and by controlling the by-pass valve for the turbine.

The operation of apparatus made in accordance with the present invention will be understood from the foregoing taken in connection with qualitative diagrammatic Fig. 3. At the bottom of Fig. 3, the lines $a$, $b$ and $c$ represent fuel input per unit, gas pressure, and gas flow in relation to load for the load range. The upper portion of the diagram represents fuel control travel and governor control pressure in relation to the load. The line $ef$ shows that the governor control pressure increases as the load. The control pressure range from $e$ to $g$ is used to operate the by-pass valve, the control pressure point $g$ being assumed to be that for zero load.

With unit I in operation, when the control pressure reaches $h$ at the upper limit of the lower load zone, unit II is rendered active; and, when such pressure reaches $i$ at the upper limit of the intermediate load zone, unit III is started.

The abutments 56a, 57a and 58a are adjusted for fuel control travels beginning at $g$, $l$ and $m$, respectively. Over the lower load zone, the fuel control travel of unit I is the vertical distance from $g$ to $h$. As the total gas output should remain unchanged at the instant unit II becomes active, it is necessary to reduce the gas output per unit in line with the number of producers rendered active. To provide for this, the fuel input to unit I must be reduced so as to equalize such input with that of the added unit II and the total fuel input at the upper limit of the lower load zone must be substantially the same as that at the beginning of the intermediate load zone so as to maintain the conditions of gradually changing gas pressure and flow over the load range. Therefore, the abutment 57a is adjusted for an initial fuel control setting $l$ and the fuel control travel of group I is reduced or cut back from $h$ to $n$, incident to resetting of spring 62, so as to be on a level with $l$, whereby, during the instant that unit II is added, the total gas output remains unchanged and the fuel inputs to units I and II are equalized.

With units I and II active, the fuel controls therefor travel the vertical distance from $n$ to $o$ for the intermediate load zone. When the control pressure reaches $i$ at the upper limit of the intermediate load zone, unit III is started, whereupon the springs 62 and 63 of units I and II are reset to reduce the fuel control travels from $o$ to $p$, $p$ being at the level of the initial setting of unit III, to equalize the fuel inputs to the units without, at the instant of adding unit III, increasing the total gas output. The fuel controls travel the vertical distance from $p$ to $q$ for the upper load zone. With reduction in load, as the upper fractional load point $i$ is passed through, unit III is stopped in response to decreasing controlling liquid pressure provided by the governor and stopping of the unit brings about resetting of the springs of units I and II so as to maintain, at the instant of stopping, the same gas output with the fuel inputs to units I and II substantially equalized. Upon continued reduction in load, when the load point $h$ is reached, unit II is stopped and further resetting of the fuel control spring of unit I takes place to avoid, as before, momentary change in the gas output at the instant unit II is stopped.

While the drawings show units designated "I," "II," and "III," it is to be understood that the word "unit" is used herein in the sense of a power developing unit made up of one or more cylinder constructions with a plurality of piston elements in each of the latter.

While the invention has been shown in but one form, it will be obvious to those skilled in the art that it is not so limited, but is susceptible of various changes and modifications without departing from the spirit thereof.

What is claimed is:

1. In combination, a turbine; a plurality of free-piston engine and compressor units utilizing fuel and air to provide motive fluid, consisting of products of combustion and air, for driving the turbine; said units including a normally active unit and one or more additional units; a governor driven by the turbine; means operated in response to the governor to start the additional unit or units as the load increases over the load range and operating in response thereto to stop the additional unit or units as the load decreases over the load range; means operated in response to the governor to control the input of fuel to the active unit or units; said last-named means including a spring or springs opposing increase of the fuel input to the unit or units; and means responsive to starting of each additional unit to reset the spring or springs of the already-active unit or units so that the fuel inputs to the latter and to the added unit are substantially equalized and responsive to stopping of a unit to reset the spring or springs of the remaining active unit or units so that the fuel inputs to the latter are substantially equalized if more than one unit remains active.

2. In combination, a turbine; a plurality of free-piston engine and compressor units utilizing fuel and air to provide motive fluid consisting of products of combustion and air; a conduit for supplying motive fluid from the units to the turbine; said units including a normally active unit and one or more additional units rendered active as the load increases; fuel-feeding devices for the respective units and including load springs opposing adjustment thereof to increase the fuel feed; said springs being arranged to exert progressively-increasing forces opposing increase in fuel feed with the spring for the fuel-feeding device of the normally active unit exerting the least force; a governor driven by the turbine and operative in response to increasing load to adjust the fuel-feeding device or devices against the opposition of its spring or their springs; means for starting and stopping each additional unit and responsive to the governor so that, as the load increases over the load range, the additional unit or units are successively started, and as the load decreases over the load range, the additional unit or units are successively stopped; and means effective, upon starting of each additional unit and the initiation of flow of motive fluid therefrom, to adjust the spring or springs of the fuel-feeding device or devices of the already-active unit or units so that the fuel inputs to the latter and to the additional unit are substantially equalized, and effective, upon stopping of an additional unit, to adjust the spring or springs of the fuel-feeding device or devices of the remaining active unit or units so that tne fuel inputs to the latter are substantially equalized.

3. Apparatus as claimed in claim 2 wherein the conduit has a branch connected to the turbine inlet and a by-pass branch connected to the turbine exhaust together with a valve for the by-pass branch and operated in response to the governor.

4. In combination, a turbine; a plurality of free-piston engine and compressor units utilizing fuel and air to provide motive fluid consisting of products of combustion and air for operation of the turbine; said units including a normally active unit and additional units rendered active as the load increases; fuel-feeding devices for the respective units; pressure-responsive devices for operating the respective fuel-feeding devices to vary the fuel feed to each unit; each pressure-responsive device including a movable member operatively connected to the associated fuel-feeding device and provided with a pressure area and a spring exerting force on the member to oppose adjustment of the fuel-feeding device in the direction to increase the fuel feed; said springs being arranged to exert progressively-increasing forces opposing increase in fuel feed with the spring for the fuel-feeding device of the normally active unit exerting the least force; a governor driven by the turbine and providing a controlling liquid pressure applied to the pressure areas of said members to operate the pressure-responsive devices to increase the fuel feed and which controlling liquid pressure increases in proportionate relation to load as the latter increases over the load range from no load to full load; means responsive to the controlling liquid pressure at different predetermined fractional load points to start the additional units successively as the increasing load passes the load points and to stop them successively as the decreasing load passes such points; and means effective, upon starting of each additional unit and the initiation of flow of motive fluid therefrom, to adjust the spring or springs of the pressure-responsive device or devices for the fuel-feeding device or devices of the already-active unit or units so that the fuel inputs to the latter and to the additional unit are substantially equalized, and effective, upon stopping of an additional unit, to adjust the spring or springs of the pressure-responsive device or devices for the fuel-feeding device or devices of the remaining active unit or units so that the fuel inputs to the latter are substantially equalized.

5. In combination, a turbine; a manifold for supplying motive fluid to the turbine; a plurality of free-piston engine and compressor units utilizing fuel and air to provide motive fluid for the manifold and consisting of products of combustion and air; said units including a normally active unit and a plurality of additional units rendered active as the load increases; branch passages for supplying motive fluid from the units to the manifold; check valves in the branch passages for the additional units; fuel-feeding devices for the respective units; pressure-responsive devices for operating the respective fuel-feeding devices to vary the fuel feed to each unit; each pressure-responsive device comprising means including a movable member operatively connected to the associated fuel-feeding device and defining an expansible chamber and a spring exerting force on the member to oppose adjustment of the fuel-feeding device in the direction to increase the fuel feed; said springs being arranged to exert progressively-increasing opposing forces on the members with the least force being exerted by the spring for the abutment of the normally active unit; a governor driven by the turbine and providing a controlling liquid pressure supplied to the displacement chambers of the pressure-responsive devices and which controlling pressure increases in proportionate relation to the load as the latter increases over the load range from no load to full load; means responsive to the controlling liquid pressure at different predetermined fractional load points to start the additional units successively as the increasing load passes the load points and to stop them successively as the decreasing load passes such points; mechanism including a member movable in one direction to effect setting of said springs such that when an additional unit is rendered active, the springs of the already-active units are adjusted to equalize substantially the fuel inputs to the latter and to the added unit and, when an additional unit is stopped, the spring or springs of the remaining units are adjusted so that the fuel inputs to the latter are substantially equalized; a piston connected to said last-named member for moving the latter; a load spring opposing motion of the piston in a direction for spring adjustment incident to an additional unit becoming active; and apparatus for applying predetermined pressures to the piston so that the latter moves to predetermined and definite positions for adjustment of the springs; said apparatus comprising means providing a plurality of spaces corresponding to the additional units and supplied with liquid through orifices from a pressure source, means including check valves affording communication of the spaces with the cylinder for the piston and arranged to open toward the cylinder, cup valves for the spaces, springs urging the cup valves in a closing direction, piston members connected to the cup valves and each piston member being provided with substantially equal and opposed pressure areas, means for applying manifold pressure to like pressure areas to overcome the springs and open the cup valves, and means responsive to starting of a unit to apply pressure to the other pressure area of the piston member corresponding to the started unit to neutralize the effect of manifold pressure thereon to render the associated spring effective to provide space pressure to position the operating piston to adjust the fuel feed spring or springs.

6. In combination, a turbine; a manifold for supplying motive fluid to the turbine; a plurality of free-piston engine and compressor units utilizing fuel and air to provide motive fluid consisting of products of combustion and air; said units including a normally active unit and a plurality of additional units rendered active as the load increases; branch passages for supplying motive fluid from the units to the manifold; check valves for the branch passages of the additional units and opening toward the manifold; fuel-feeding devices for the respective units; pressure-responsive devices for operating the respective fuel-feeding devices; each pressure-responsive device including a member operatively connected to the associated fuel-feeding device and provided with a pressure area and a spring opposing movement of the member in the direction to increase the fuel feed; said pressure-responsive device springs being arranged to exert progressively-increasing forces on the members with the spring exerting the least force acting on the member corresponding to the normally active unit; a governor driven by the turbine and providing liquid under controlling pressure which increases and decreases in proportionate relation to the load from no load to full load and which pressure is applied to the member pressure areas to move the members of the pressure-responsive devices against opposition of the springs thereof to adjust the fuel-feeding devices for increase in fuel feed; means responsive to the controlling liquid pressure at different fractional load points to start the additional units successively as the increasing load passes the load points and to stop them successively as the decreasing load passes such points; mechanism including an operating member movable in a first direction to adjust the setting of said pressure-responsive device springs so that, as an additional unit becomes active, the load is shared by the added unit and the already-active unit or units and movable in a second or opposite direction to adjust the setting of the springs so that, as an additional unit is rendered inactive, the load is carried by the remaining active unit or units; an operating piston connected to said operating member; a load spring exerting force on the connected operating member and operating piston to move the operating member in said second direction; an operating cylinder for the piston; means providing a plurality of spaces corresponding to the respective additional units; means including orifices for supplying liquid from a pressure source to said spaces; escape valves controlling the pressures in said spaces and each valve presenting an area exposed to the pressure of liquid in its space so that force is exerted by such pressure on the valve tending to move it in an opening direction to lower the space pressure; springs for exerting forces on the escape valves for moving each of the latter in a closing direction until the force applied thereto by the increasing space pressure force balances the spring force; means including check valves for connecting the spaces to the operating cylinder and such check valves opening toward the operating cylinder so that the maximum of the space pressures is applied to the cylinder to exert force on the operating piston in opposition to that of the load spring; piston members connected to the escape valves and each having opposed and substantially equal pressure areas; means for applying manifold pressure to like pressure areas of the piston members to exert forces thereon tending to move the escape valves in an opening direction; and means for subjecting the other pressure areas of said piston members to the pressures existing at the unit sides of the branch passage check valves so that, upon each additional unit being started, the increase in such pressure at the unit side of its branch passage check valve and applied to the piston member opposes the effect of manifold pressure applied thereto until neutralization of pressures applied to the piston member takes place, at which time the branch passage check valve is open and motive fluid flows from the unit to the manifold; said escape valve springs being arranged to exert closing forces on the escape valves such that, upon neutralization of pressures applied to an escape valve piston member incident to starting of an additional unit, the spring for the escape valve exerts force on the latter to establish in the associated pressure space and in the operating cylinder pressure of liquid exerting force on the escape valve to balance the spring force and which pressure moves the operating piston until the force thereof exerted on the latter is balanced by that of the load spring, whereby, by provision of escape valve springs of suitable relative strengths the operating piston and said member may be caused to move to adjust the setting of said pressure-responsive device springs suitably for an additional unit being rendered active or being rendered inactive.

7. In combination, a turbine; a plurality of free-piston engine and compressor units utilizing fuel and air to provide motive fluid consisting of products of combustion and air for driving the turbine; said units including a normally active unit and one or more additional units; a governor driven by the turbine and providing controlling pressure which increases as the load increases; means responsive to controlling pressure for stopping and starting each additional unit; fuel-feeding devices for the respective units and each device including a fuel control element which is movable to vary the fuel input to the associated unit; pressure-responsive devices for operating the respective fuel control elements; each pressure-responsive device including a spring and a member connected to the associated fuel control element; each of said members having a pressure area and the associated spring exerting force thereon to oppose pressure applied to the pressure area; means providing for application of governor controlling pressure to each of said pressure areas; stops cooperating with the fuel control elements to limit movement of the latter by the springs to decrease the fuel input; means providing for adjustment of each of the stops to vary the initial fuel input positions of the associated fuel control elements and the settings of the associated springs, whereby the springs may be set so that the pressure-responsive devices respond to different controlling pressures with the pressure-responsive device of each additional unit responding to higher pressure than the normally active unit; and means responsive to starting of an additional unit to reset the spring and the fuel input position of the fuel control element of each active unit to correspond to the spring setting and initial fuel input position of the fuel control element of the unit being added.

ANTHONY F. SCHWENDNER.

REFERENCES CITED

The following references are of record in the file of this patent:

FOREIGN PATENTS

| Number | Country | Date |
|---|---|---|
| 467,561 | Great Britain | Oct. 15, 1934 |